Oct. 11, 1966 B. G. WOOD 3,278,900

CHARACTER RECOGNITION SYSTEM EMPLOYING PULSE TIME INTERVAL MEASUREMENT

Filed April 1, 1963 11 Sheets-Sheet 1

INVENTOR
BILLY G. WOOD
BY [signature]
AGENT

Oct. 11, 1966 B. G. WOOD 3,278,900

CHARACTER RECOGNITION SYSTEM EMPLOYING PULSE TIME INTERVAL MEASUREMENT

Filed April 1, 1963 11 Sheets-Sheet 4

| REGISTER POSITION | A | B | C | D | E | F | G | H |
|---|---|---|---|---|---|---|---|---|
| ZONES | 1 | 2 | 3 | 4 | 5 | 6 | 7 | 8 |
| 0 (8,2) | + | − | 0 | 0 | 0 | 0 | + | − |
| 1 | + | 0 | + | − | − | 0 | 0 | 0 |
| 2 | + | − 0 | 0 | + 0 | − | 0 | 0 | 0 |
| 3 | + | + | − | 0 | 0 | − 0 | 0 | 0 |
| 4 | + | 0 | − 0 | 0 | + | 0 | − | 0 |
| 5 | + | − 0 | 0 | 0 | + 0 | − | 0 | 0 |
| 6 | + | − 0 | + 0 | − 0 | 0 | + | − | 0 |
| 7 | + | − 0 | + | − | + 0 | − 0 | 0 | 0 |
| 8 | + | + | − | 0 | 0 | + | − | − |
| 9 | + | − 0 | − | 0 | 0 | + 0 | − | 0 |
| TRANSIT | + | 0 | 0 | − | 0 | + | 0 | − |
| AMOUNT | + | 0 | − | + | − | + | 0 | − |
| ON US | + | 0 | 0 | − | + | − | + | − |
| DASH | + | − | + | 0 | − | + | 0 | − |

FIG. 10

United States Patent Office 3,278,900
Patented Oct. 11, 1966

3,278,900

CHARACTER RECOGNITION SYSTEM EMPLOYING PULSE TIME INTERVAL MEASUREMENT

Billy G. Wood, Apalachin, N.Y., assignor to International Business Machines Corporation, New York, N.Y., a corporation of New York Filed Apr. 1, 1963, Ser. No. 269,537
4 Claims. (Cl. 340—146.3)

This invention relates to a character recognition system and, more particularly, to an improved pulse time interval measuring system for determining the sequence and time separation of character representing pulses.

Various methods and arrangements for the identifications of printed characters are already known. In some of these methods the characters are scanned along certain lines and the transitions from the character field to the character or conversely are determined for the evaluation purpose. In other methods, the scanning field is divided into a scanning raster and each of the raster elements is examined with respect to the black and white portions of the characters. With all of the conventional methods, the scanning operation may be accomplished either optically or magnetically depending on how the characters are arranged on the record medium. In order that it may be possible for the scanning results, which finally exist as electrical signals, to be assigned to the characters to be identified, it is necessary in most cases to provide a storage device in which the incoming signals are at first stored and from there applied to an evaluating configuration.

The subject matter of the present invention concerns the automatic identification of characters in character recognition systems of the type in which the vertical edges of the characters to be recognized are utilized as at least one criteria of the identification of the character. The characters to be recognized are sliced vertically into a plurality of adjacent zones. Information which may be useful in determining the character is the leading and trailing edges of the vertical contour of the character. To obtain this information, it is necessary to determine, with respect to a suitable datum, such as the starting point of the first character zone, the relative times of occurrence of intercept with the leading and trailing edge of the character contours.

Accordingly, a principal object of this invention is to provide an improved time interval measuring system.

Another object of the invention is to provide an improved time interval measuring system for detecting the relative times of occurrence of a succession of distinctive events.

Still another object of the invention is to provide an improved time interval measuring system which is capable of quantitatively distinguishing between the relative time of occurrence of a succession of distinctive events.

A further object of the invention is to determine the presence or absence of a signal at predetermined points along a character sensing cycle.

Briefly described, the present invention contemplates a pattern recognition system in which characters are recorded with magnetic ink. The data can then be read by passing each character successively under a reading head. The output of the reading head produces a resultant wave shape which is uniquely characteristic for each different character. The output of the reading head is passed through an amplifier and quantizer with output bit signals therefrom occurring at different times with respect to a reference starting time. The bit signals serve to gate the output of pulse generating circuitry for application to pulse width analyzing circuitry for determining the presence or obsence of bit signals at predetermined times, and with the output therefrom being insertable into a three level shift register. The bit signals also serve to controllably gate the input to the shift registers. The outputs of the shift registers are representative of the character stored therein and are applied to a coincidence circuit arrangement for subsequent utilization by automatic data-processing equipment.

The foregoing and other objects, features, and advantages of the invention will be apparent from the following more particular description of a preferred embodiment of the invention, as illustrated in the accompany drawings.

In the drawings:

FIGS. 1*a* through 1*c* form a schematic block diagram of the circuits of a preferred embodiment of the invention for a pulse time interval measuring system.

Figure 8A:
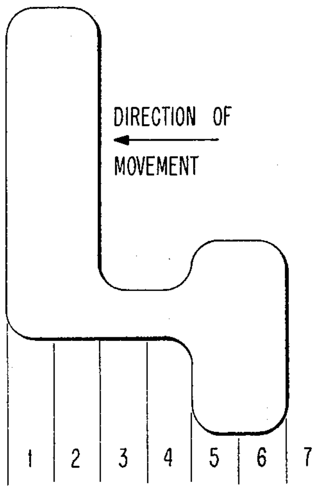
Figure 8B:
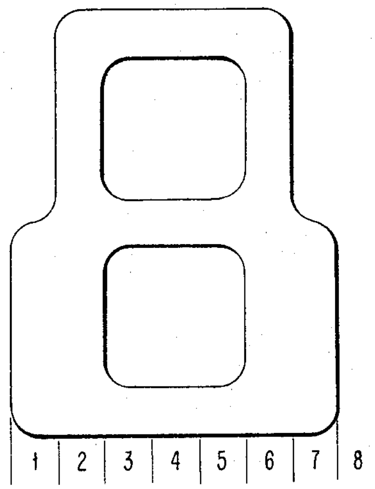

FIGS. 8*a* and 8*b* are diagrammatic showings of the font for the characters 4 and 8 to an enlarged scale and as adapted for evaluation by the pulse time interval measuring system of the instant invention.

Figure 8C:
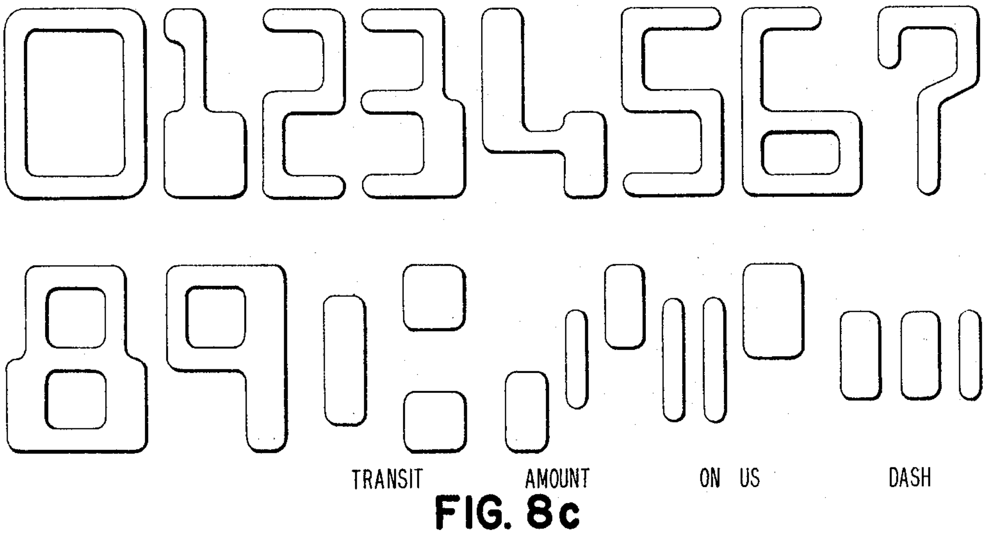

FIG. 8*c* is a diagrammatic showing of the font for the characters 0 through 9 and 4 special characters.

Figure 9:
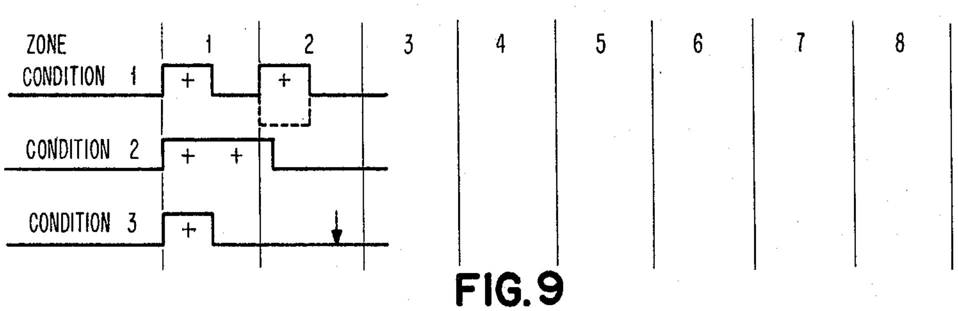

FIG. 9 is a diagrammatic presentation of the waveforms capable of being sensed by the pulse time interval measuring system of the present invention.

FIG. 10 is a character chart showing the zone and signal breakdown for the digital characters 0 through 9 and 4 special characters.

Figure 11:
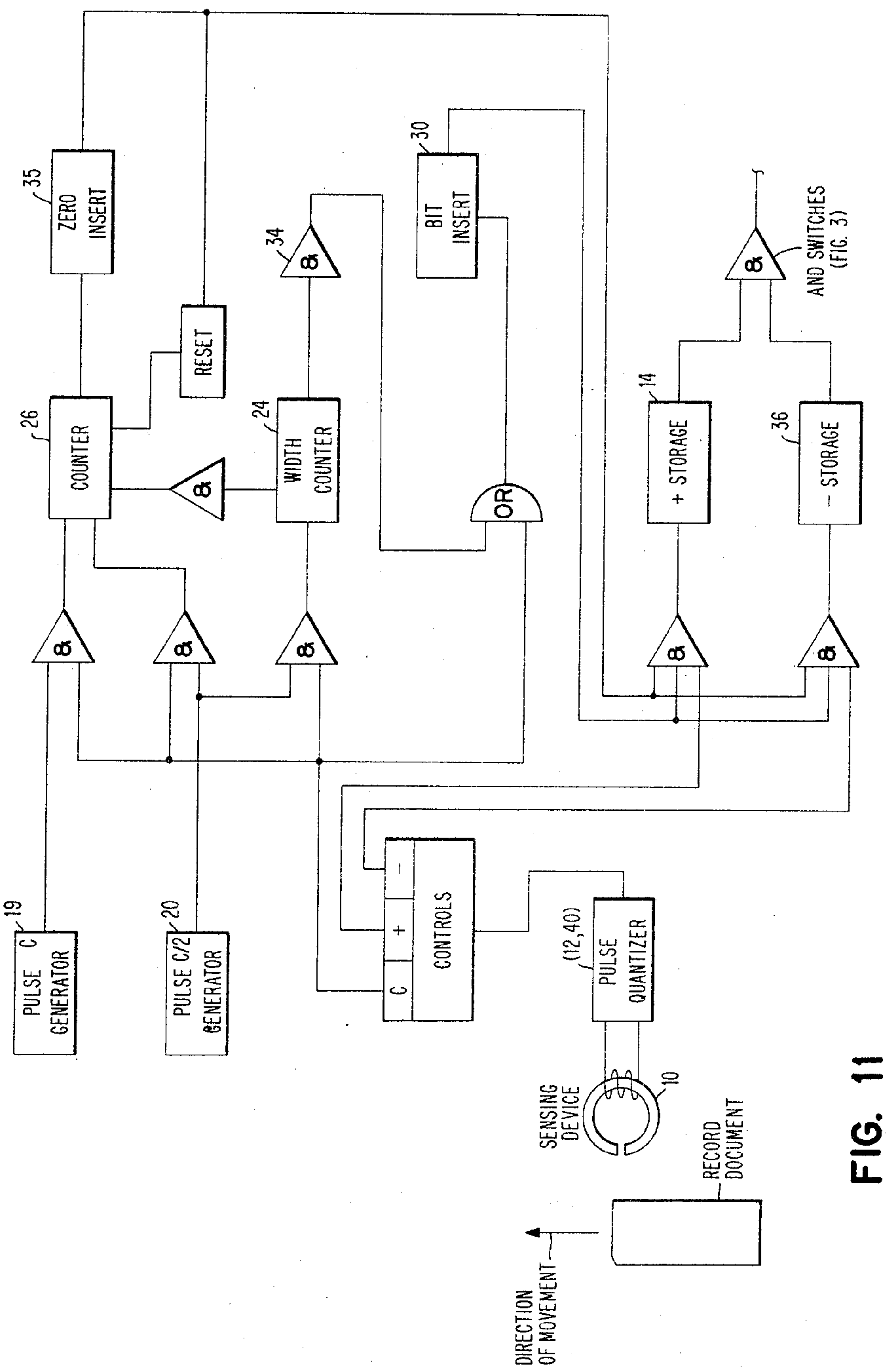

FIG. 11 is a schematic flow diagram of a pulse time interval measuring system.

Reference is made to FIGS. 8*a* and 8*b*, which show the exemplary numbers 4 and 8 which are printed in a type font in accordance with the method of this invention. The characters are recorded with a magnetic ink. The records having characters imprinted thereon are transported so that the characters will pass in sequence under a character sensing or reading device. The output obtained from the reading device for each character is a signal having a wave shape which is characteristic of the character being sensed by the sensing device. Changes in the signal caused by the presence or absence or by the increase or decrease of magnetic ink at predetermined zone points of the character are converted into character representing signals by the apparatus to be described hereinafter.

With reference to FIGS. 8*a* and 8*b* it may be noted that the characters are divided vertically into a plurality of adjacent zones. Significant changes in the increase or decrease of magnetic ink occurs at the zone dividing lines. The changes due to an increase serve to induce a plus signal in the sensing device and changes due to a decrease of magnetic ink serve to induce minus signals in the sensing device. Fundamentally, these plus and minus signals serve to control the pulse time interval measuring system of the instant invention.

Figure 5:
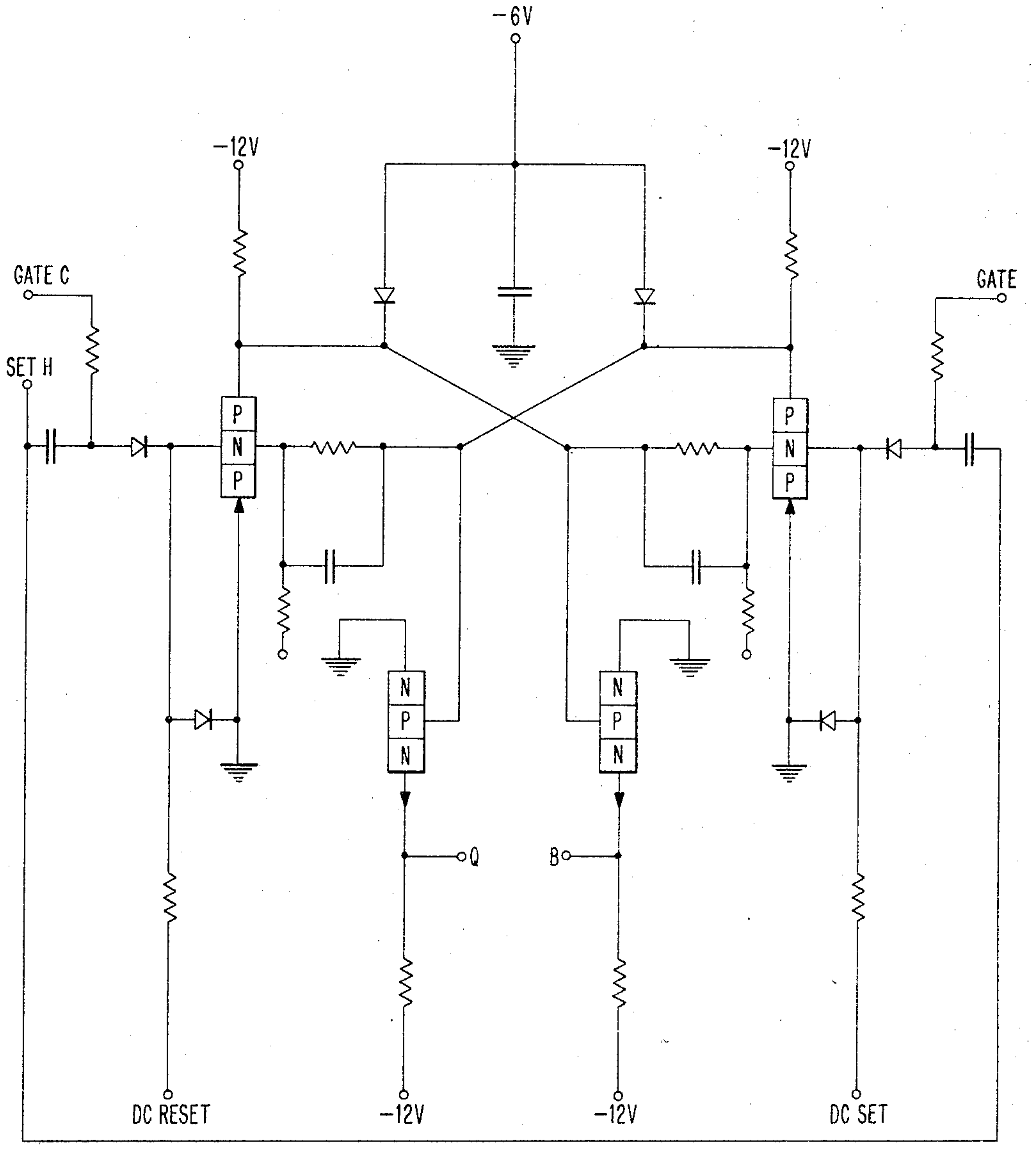
FIG. 5 is the circuit detail for a trigger circuit of the type employed in the counter circuits shown in FIG. 1*b*.
Figure 6:
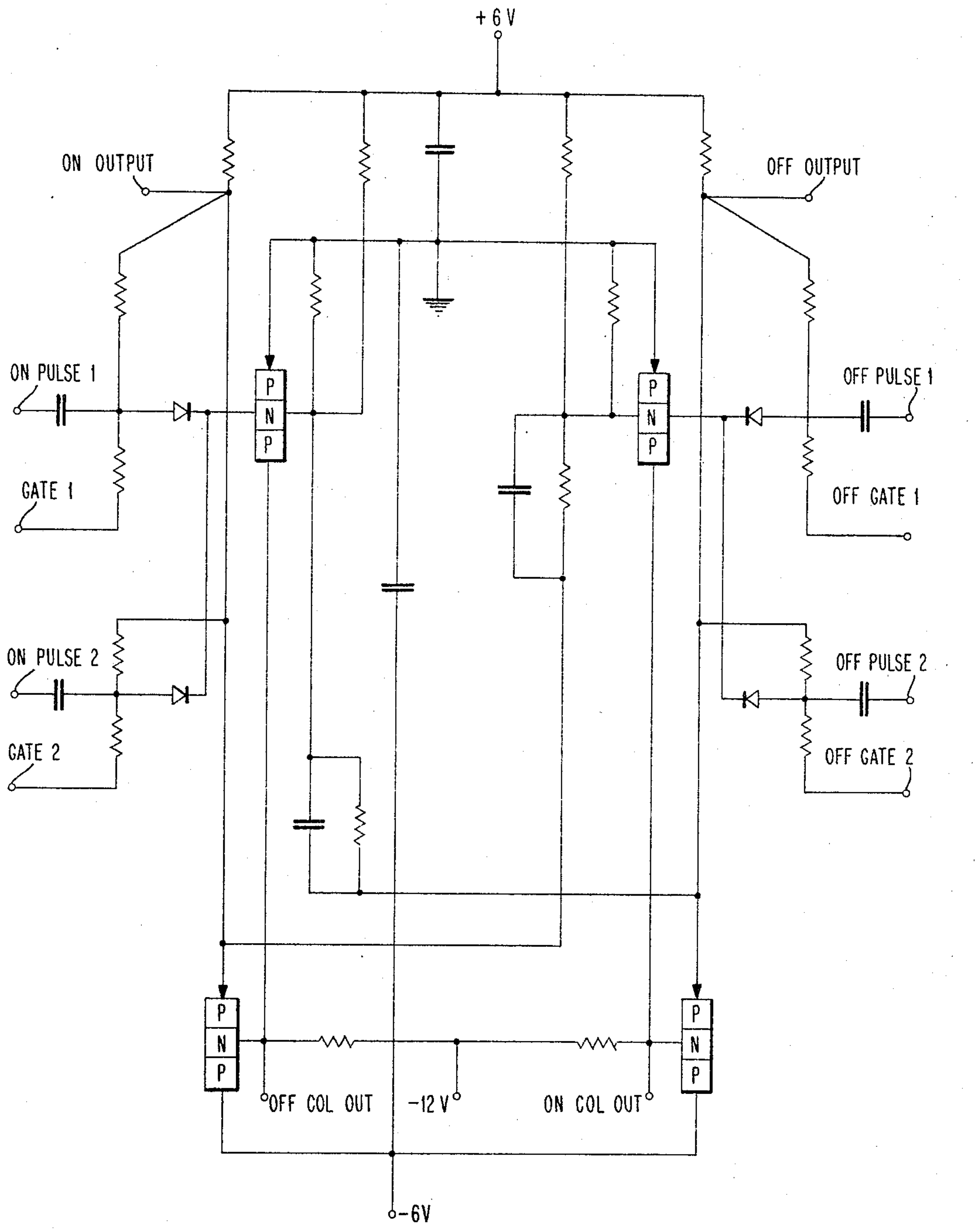
FIG. 6 is the circuit detail for a double gated trigger circuit of the type employed in the first stage of the shift registers shown in FIG. 1*c*.
Figure 7:
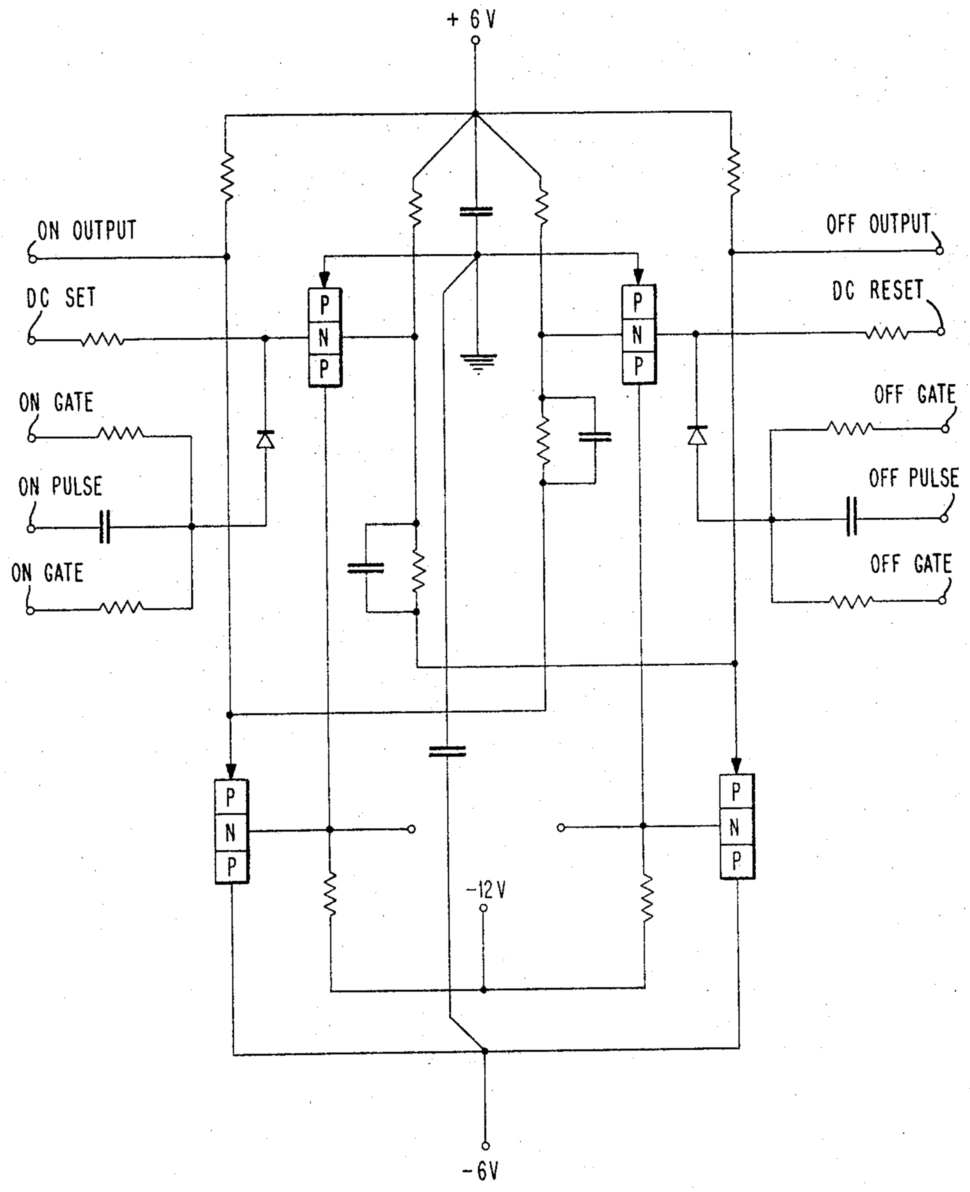
FIG. 7 is the circuit detail for a trigger circuit of the type employed in the second and remaining stages of the shift registers shown in FIG. 1*c*.

FIGS. 4 through 7 show transistorized trigger circuits of the "flip-flop" variety. For example, the triggers shown in FIGS. 4 through 7 are of the type which require the application of a gate pulse to either the "on" side or the "off" side in order for the application of the A.C. pulse to be effective for causing a switching action of the trigger circuit. The triggers of FIGS. 4, 5, and 7 can be set or reset by application of a D.C. pulse applied to the appropriate set or reset terminal. FIG. 5 shows a trigger particularly adapted for use in a binary counter arrangement wherein the application of a pulse to the set terminal causes the trigger to switch in one direction and the application of the next subsequently occurring pulse to the same terminal causes the trigger to reset to its original state.

Figure 1A:
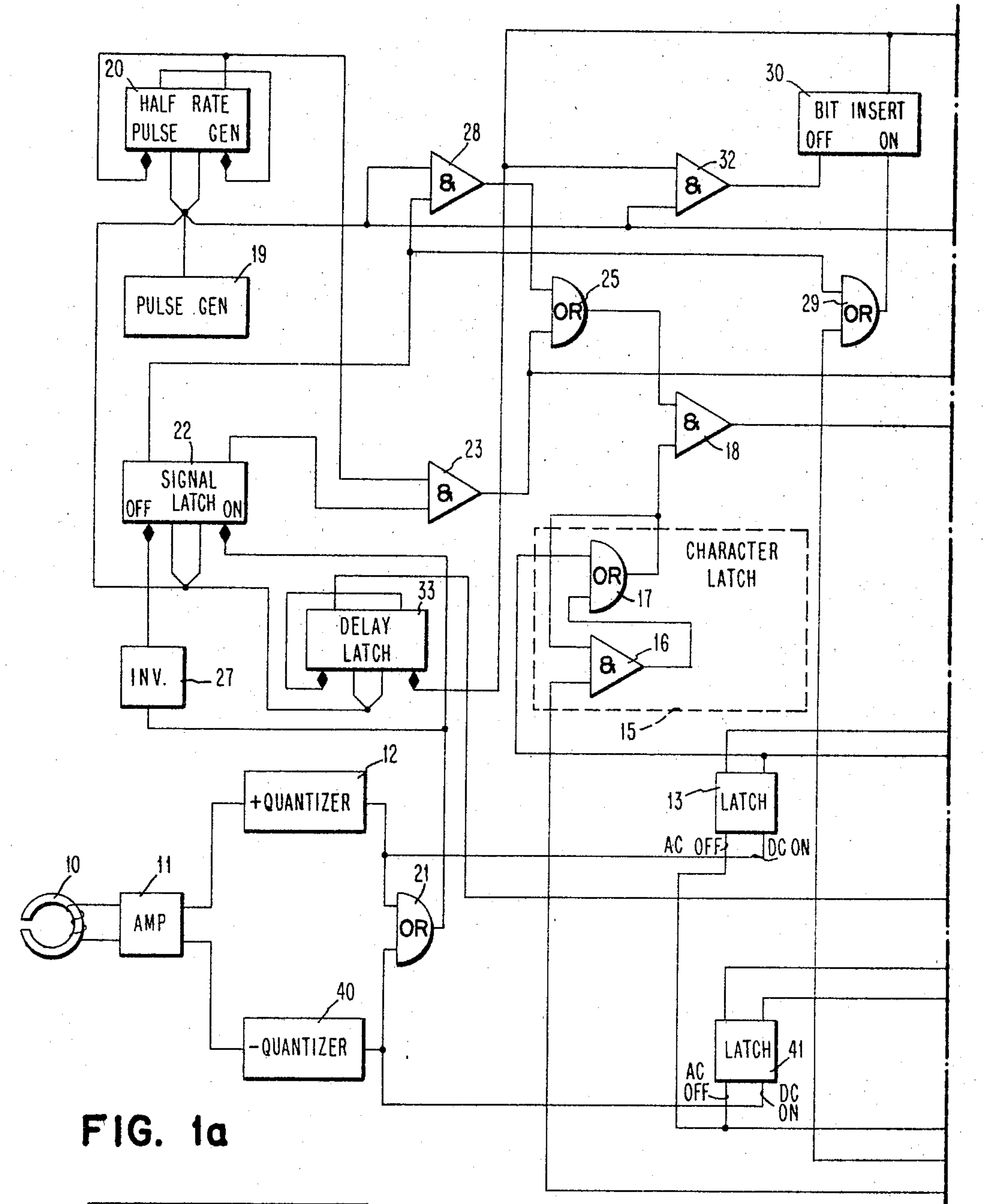
Figure 2:
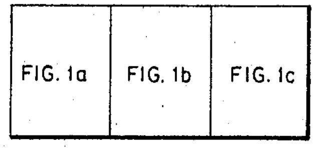
FIG. 2 is a diagram showing the manner in which FIGS. 1*a* through 1*c* should be joined together.
Figure 1B:
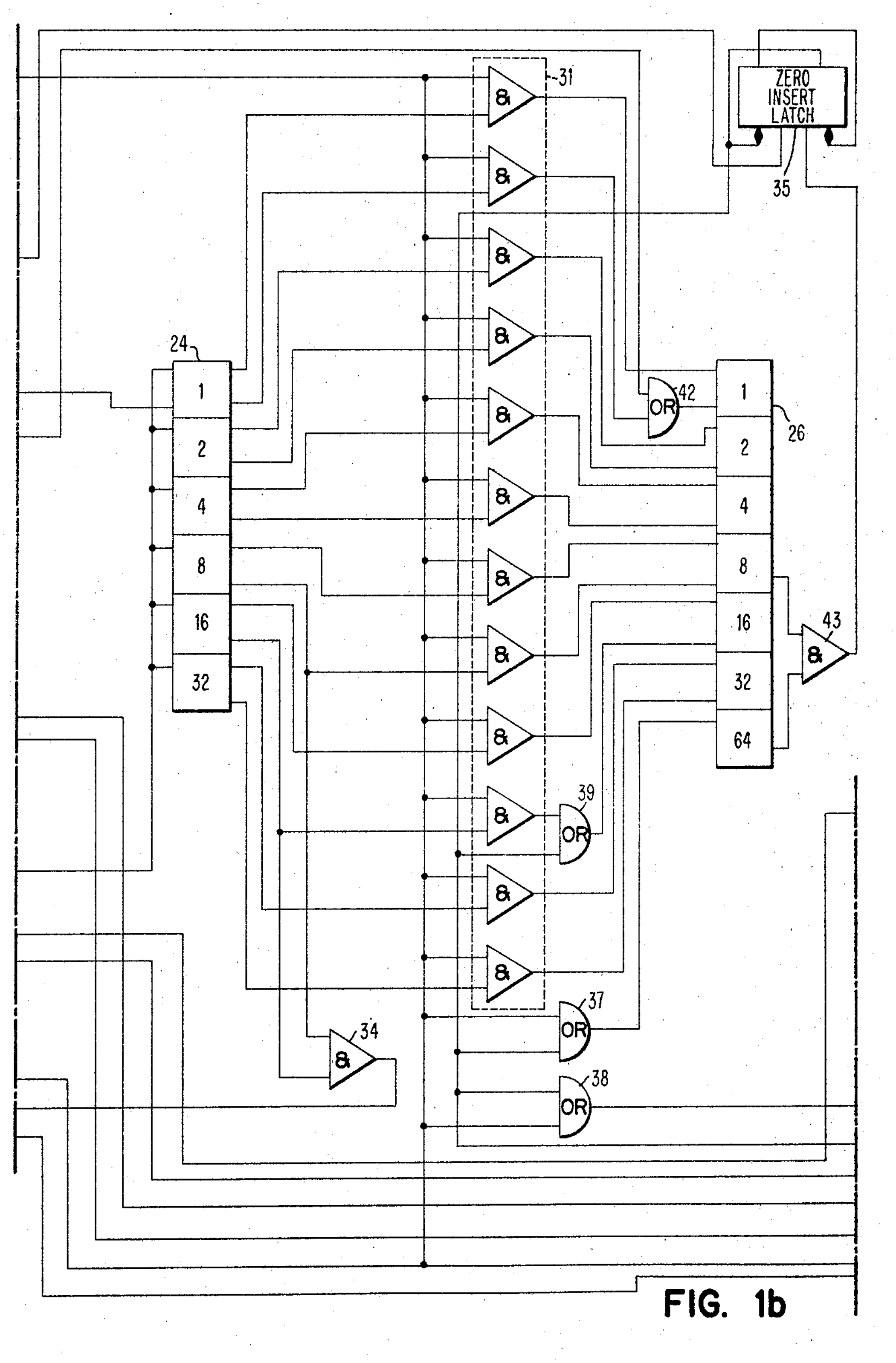
Figure 1C:
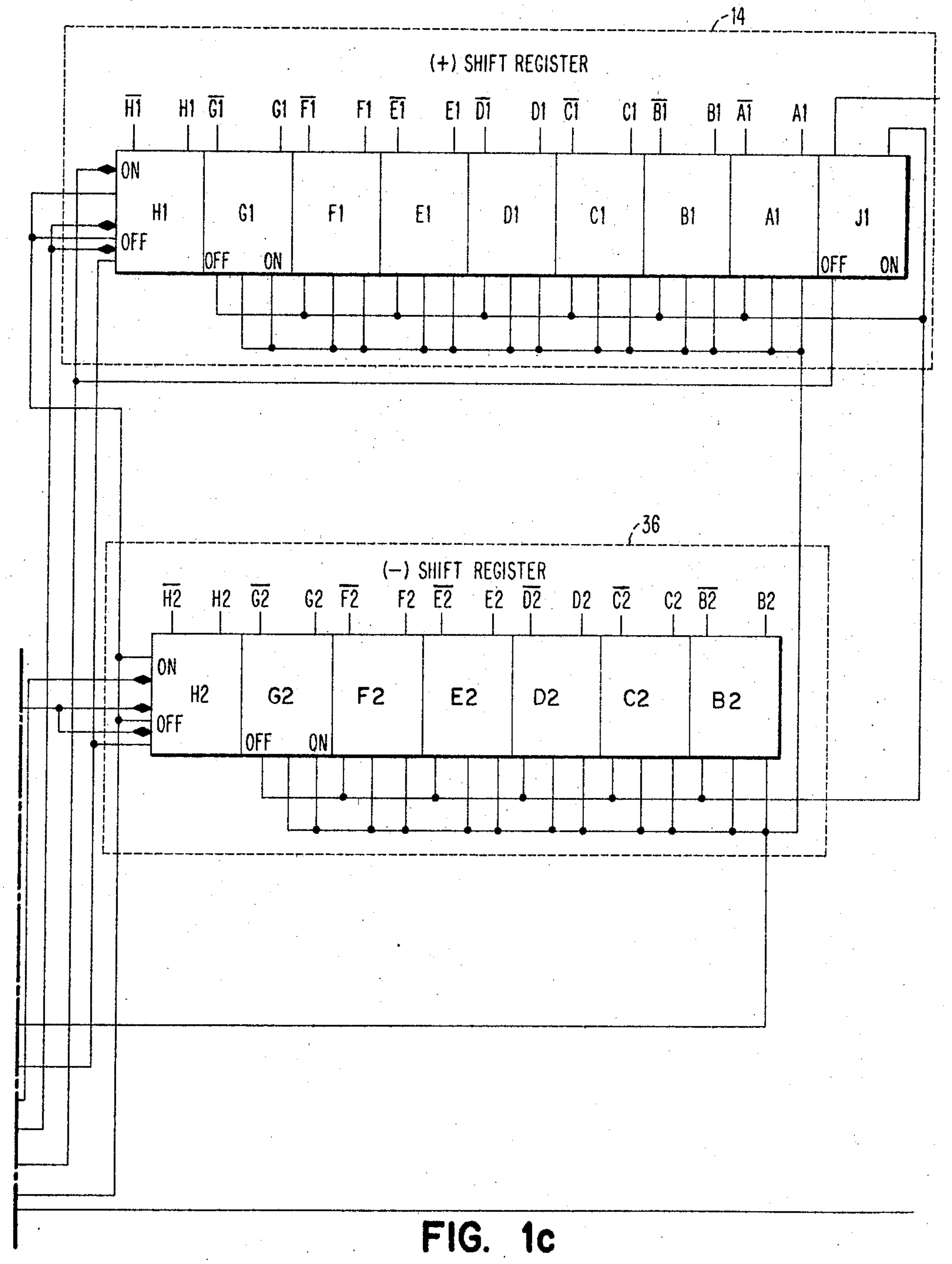

The principal circuits of the pulse time interval measuring system are illustrated in block diagram form in FIGS. 1*a* through 1*c*. FIG. 2 shows the manner in which these views should be assembled.

Referring to FIGS. 1*a* through 1*c*, the passing of record mediums having characters printed thereon under the sensing device 10 will induce plus and minus signals in the sensing device 10 in a prescribed pattern according to the character being sensed. The leading edge of all characters will cause a plus signal to be induced in the sensing device 10. Subsequently occurring increases and decreases in the magnetic ink of each character will cause subsequently occurring plus and minus signals, respectively. This condition will become more fully apparent as the description proceeds.

Actually, there are three different basic types of conditions that may occur in a character sensing operation and which affect the operation of pulse time interval measuring system. These conditions are illustrated in FIG. 9 wherein condition "1" shows two consecutive occurring pulses; condition "2" exemplifies a double width positive pulse condition which may extend into the next subsequently occurring zone; and condition "3" where a plus pulse in zone 1 is not followed by a pulse in the next subsequently occurring zone. The operation of the pulse time measuring system will now be described for each of the above-mentioned conditions, to illustrate how the system functions to achieve the intended performance.

*Condition "1"*

For condition "1" the leading edge of a character induces in the sensing device 10 a signal which is coupled to an amplifier 11 wherein the signal is amplified and then coupled to the plus quantizer 12. The leading edge of the plus signal output from the plus quantizer 12 serves to turn the plus latch 13 "on." When the plus latch 13 goes "on," the output from the the "on" side is applied to the "off" side input of the J stage of the plus shift register 14 thereby triggering the J stage to an "off" state. The "off" side output from the J stage of the plus shift register 14 is applied as a gate to the AND switch 16 of character latch 15. Also, when the plus latch 13 goes "on" the output from the "on" side is applied to the OR switch 17 of the character latch 15 with the output from the OR switch 17 being applied to the AND switch 16. The coincident inputs to AND switch 16 serve to provide a character latch 15 output which is then applied as a gate to the AND switch 18.

A free-running pulse generator 19 is adapted to produce clock pulses at a predetermined frequency. These clock pulses are applied to the half-rate pulse generator 20 which functions to produce half-rate clock pulses.

The plus signal output from quantizer 12 is coupled through the OR switch 21 and applied as a gate to the "on" side of the plus-minus signal latch 22. The next occurring clock pulse will turn the plus-minus signal latch 22 "on." The "on" side output from the plus-minus signal latch 22 applied as a gate to the AND switch 23 and will gate half-rate clock pulses from the pulse generator 20 into the first stage of the width counter 24. The output of AND switch 23 is also passed through the OR switch 25, the AND switch 18 and the OR switch 42 for introducing half-rate clock pulses into the pulse counter 26. At the trailing end of the plus pulse in zone 1 a total of 12 pulses at the half clock rate will have been introduced into both the width counter 24 and the pulse counter 26, but these counts are ineffective at this instant.

The absence of the plus pulse output from quantizer 12 and to the input of inverter 27 provides a gate to the "off" side of the plus-minus signal latch 22. The plus-minus signal latch 22 will be triggered to an "off" state by the next occurring clock pulse. The plus-minus signal latch 22 in the "off" state removes the gate from the AND switch 23 and provides a gate to the AND switch 28 to enable passage of clock pulses therethrough. The clock pulses are coupled through AND switch 28, OR switch 25, AND switch 18 and OR switch 42 and serve to pulse the pulse counter 26 at the full clock rate. The "off" signal output of the plus-minus signal latch 22 is coupled through the OR switch 29 and serves to trigger the bit insert latch 30 into an "on" state. The output from the "on" side of the bit insert latch 30 serves to gate the count output from the width counter 24 through the switches 31 and into the pulse counter 26, which is insignificant at this instant. The "on" signal output from the bit insert latch 30 coincident with the gate provided by the plus latch 13 "on" output triggers the H stage of the plus shift register 14 into an "on" state, and coincident with the not-minus gate provided by the "off" output of the minus latch 41 serves to insure the H stage of the minus shift register 36 remains in an "off" state. The "on" signal output from the bit insert latch 30 triggers the plus latch 13 into an "off" state. The "on" signal output from the bit insert latch 30 also gates the AND switch 32 to enable the next occurring clock pulse to trigger the bit insert latch 30 into an "off" state, and gates the delay latch 33 to that the next occurring clock pulse will trigger the delay latch 33 into an "on" state. The delay latch 33 "on" output gates the "off" side of the latch for the next occurring clock pulse to effectively turn "off" the delay latch 33. Thus, the delay latch 33 remains "on" for one clock pulse time. The delay latch 33 "off" output serves to trigger and reset the width counter 24.

Summarizing the operation thus far, we have inserted a plus signal condition into the H stages of the plus shift register 14 and the minus shift register 36, which is represented by the H stage of the plus shift register 14 being in an "on" state and the H stage of the minus shift register 36 being in an "off" state.

During the interval between the trailing edge of the plus pulse in the first zone and the leading edge of the plus pulse in the second zone FIG. 9, clock pulses are introduced into the pulse counter 26 at the full clock rate. At the leading edge of the plus pulse in zone two, the output from quantizer 12 will turn "on" the plus latch 13 which, in turn, provides the gate for the "on" side of the H stage of the plus shift register 14, and provides a gate for the "on" side of the plus-minus signal latch 22 which will be triggered to an "on" state by the next occurring clock pulse. This control causes half-rate clock pulses to be introduced into the width counter 24 and into the pulse counter 26, in the same manner as previously described for the plus pulse in the first zone. At the leading edge of the plus pulse in zone two, the count in pulse counter 24 will be zero and the pulse count in pulse counter 26 will be approximately 36 comprising the 12 pulses introduced during the plus pulse time in zone 1 and the full clock rate of 24 pulses introduced between the plus pulses in zone one and zone two.

At the trailing edge of the plus signal in zone two, the output from the plus quantizer 12 will cease and there will be no input to inverter 27 which will provide a gate for the "off" side of the plus-minus signal latch 22 which will be triggered "off" by the succeeding clock pulse. The switching of the plus-minus signal latch 22 to an "off" state will terminate the input of half-rate clock pulses to the width counter 24 and pulse counter 26 and provide a gate to AND switch 28 to start the flow of clock rate pulses into the pulse counter 26. The "off" signal output from the plus-minus signal latch 22 coupled through OR switch 29 will trigger the bit insert latch 30 "on." The "on" output from the bit insert latch 30 is coupled through OR switch 38 and serves to shift the state of all stages of the plus shaft register 14 and the minus shift register 36 one position to the right. The "on" output from the bit insert latch 30 coincident with the gate provided by the plus latch 13 "on" output will trigger the H stage of the plus shift register 14 to an "on" state and coincident with the not-minus gate provided by the "off" output of the minus latch 41 serves to insure or trigger the H stage of the minus shift register 36 to an "off" state. The "on" output from the bit insert latch 30 will reset the pulse counter 26 to a count of 12 which has been stored in the width counter 24 through the medium of coincident inputs to switches 31. The "on" output from bit latch 30 will also trigger the plus latch 13 "off," gate the delay latch 33 for switching by the next occurring clock pulse, and gate the bit insert latch 30 for the next occurring clock pulse. The next occurring clock pulse triggers the delay latch 33 "off" and the "off" output serves to reset the width counter 24 to a zero condition.

Recapitulating, we have now shown how the two plus signals occuring in zone one and zone two have been introduced into the plus shift register 14 and the minus shift register 36 which is represented by the G and H stages of the plus shift register 14 being in an "on" state and the G and H stages of the minus shift register 36 being in an "off" state.

*Condition "2"*

In FIG. 9 is may be noted that the plus pulse condition is double width and extends from the beginning of zone one into zone two, and may or may not be followed by a plus condition in zone three. The leading edge of a character passing under sensing device 10 will cause a plus signal output from quantizer 12, in the same manner as previously described. The leading edge of the plus signal in zone one will trigger the plus latch 13 to an "on" state. The "on" output from plus latch 13 will provide a gate for the "on" side of the H stage of the plus shift register 14, turns "off" the J stage of the plus shift register 14 which gates AND switch 16 of character latch 15. The plus signal output from plus latch 13 turns the character latch 15 "on" and provides a gate to the AND switch 18. The leading edge of the plus signal in zone one also provides a gate to the plus-minus signal latch 22 which will be turned "on" by the next occurring clock pulse. The "on" signal output from the plus-minus signal latch 22 provide a gate to the AND switch 23 to enable half-rate clock pulses to be coupled through AND switch 23 and introduced as inputs to the width counter 24; and coupled through the OR switch 25, AND switch 18 and OR switch 42 provides half-rate clock pulse inputs to the pulse counter 26. Since the pulse signal condition in zone one extends to the leading edge of zone two half-rate clock pulses being introduced into width counter 24 will be at the beginning of zone two time have arrived at a quantity of 24 pulses. With the width counter 24 standing at a count of 24 pulses, the "on" output from stage 16 and stage 8 are coupled to the AND switch 34. The coincident input to AND switch 34 provides an output which is coupled through OR switch 29 and serves to trigger the bit insert latch 30 into an "on" state. The "on" signal output from bit insert latch 30 will serve to trigger the H stage of the plus shift register 14 to an "on" state; will trigger the H stage of the minus shift register 36 to an "off" state; will provide a gating pulse to the switches 31 for the purpose of transferring the 24 count from the width counter 24 into the pulse counter 26; and will also trigger the pulse latch 13 to an "off" state. The "on" signal output from bit insert latch 30 will also provide gates for the delay latch 33 and the AND switch 32. The next occurring clock rate pulse applied through AND switch 32 will trigger the bit insert latch 30 "off" and will trigger the delay latch 33 "on." The next occurring clock rate pulse will trigger the delay latch 33 "off" with the "off" output signal from delay latch 33 serving to reset the width counter 24 to a zero state.

At the trailing edge of the plus pulse occurring in zone two, the output from the plus quantizer 12 will cease and there will be no input to inverter 27 which will provide a gate for the "off" side of the plus-minus signal latch 22 which will be triggered "off" by the succeeding clock pulse. The switching of the plus-minus signal latch 22 to an "off" state will terminate the input of half-rate clock pulses to the width counter 24 and pulse counter 26 and provide a gate to AND switch 28 to start the flow of clock rate pulses into the pulse counter 26. The "off" signal output from the plus-minus signal latch 22 coupled through OR switch 29 will trigger the bit insert latch 30 "on." The "on" output from the bit insert latch 30 is coupled through OR switch 38 and serves to shift the state of all stages of the plus shift register 14 and the minus shift register 36 one position to the right. The "on" output from the bit insert latch 30 coincident with the gate provided by the plus latch 13 "on" output will trigger the H stage of the plus shift register 14 to an "on" state and coincident with the not-minus gate provided by the "off" output of the minus latch 41 serves to insure or trigger the H stage of the minus shift register 36 to an "off" state. The "on" output from the bit insert latch 30 will reset the pulse counter 26 to a count of 12 which has been stored in the width counter 24 through the medium of coincident inputs to switches 31. The "on" output from bit latch 30 will also trigger the plus latch 13 "off," gate the delay latch 33 for switching by the next occurring clock pulse, and gate the bit insert latch 30 for the next occurring clock pulse. The next occurring clock pulse triggers the delay latch 33 "off" and the "off" output serves to reset the width counter 24 to a zero condition.

Summarizing, it has been shown how a double width plus pulse in zone one and extending into zone two has served to introduce two bit inserts into the H and G stages of the plus shift register 14 and the minus shift register 36, which is represented by the H and G stages of the plus shift register 14 being in an "on" state and the H and G stages of the minus shift register 36 being in an "off" state. The double width pulse in zone one may or may not be followed by another plus signal condition in zone three. In the event that there is a plus signal condition in zone three, the sequence of operation for pulsing the counters 24 and 26 will be the same as previously described for the plus pulse in zone two of condition one. In the absence of a plus signal in zone three, the operations of the circuitry become apparent from the now to be described operations for conditions "3."

*Condition "3"*

Referring to FIG. 9, there is shown a plus signal in zone one which is not followed by any signal in zone two. The operations of the circuit will be the same as for the plus pulse occurring in zone one of condition one, as previously described. During the plus signal state in zone one, half-rate clock pulses will be introduced into the width counter 24 and into the pulse counter 26. At trailing edge of the plus signal in zone one, a bit insert operation will be effected in the same manner as previously described to turn the H stage of the plus shift register 14 to an "on" state and the H stage of the minus shift register 36 to an "off" state. The plus-minus signal latch 22 will be turned "off" and the "on" signal output will terminate thereby stopping the flow of half-rate clock pulses through AND switch 23 for insertion into the width counter 24. The "off" signal output from the plus-minus signal latch 22 will be applied to AND switch 28 and serve to gate full clock rate pulses therethrough and the output from AND switch 28 will pass through the OR switch 25, the AND switch 18 and the OR switch 42 serving to introduce full rate clock pulses into the pulse counter 26. At the trailing edge of the plus signal in zone one, the pulse counter 26 will stand at approximately a twelve count due to the flow of half rate pulses into the pulse counter during the plus signal time in zone one.

Flow rate clock pulses will be introduced into the pulse counter 26 until a point approximately ¾ of the way through zone two, as indicated by the arrow. At this time the pulse count in pulse counter 26 will reach a quantity of 72. The "on" signal output from stages 64 and 8 of pulse counter 26 will be coincidently applied to the AND switch 34. The output from AND switch 34 will be applied to the "on" side of zero insert latch 35 and serve to trigger this latch to an "on" state. The "on" signal output from the zero insert latch 35 is coupled through the OR switch 38 and serves to shift all stages of the plus shift register 14 and the minus shift register 36, one position to the right. The same zero insert latch "on" output applied in coincidence with the not-plus gate from the "off" side of the plus latch 13 to the H stage of the plus shift register 14 and in coincidence with the not-minus gate from the "off" side of the minus latch 41 to the H stage of the minus shift register 36 serves to trigger the H stages to an "off" state. The "on" signal output from the zero insert latch 35 serves to reset counter 26 to a value of 24 by applying a signal through the OR switch 37 to stage 64 of the pulse counter 26 to trigger the stage to an "off" state, and is applied through the OR switch 39 to trigger stage 16 of the pulse counter 26 to an "on" state. The zero insert latch 35 "on" output also serves to gate the "off" side of the zero insert latch 35 so that the succeeding clock pulse will trigger the latch to an "off" state.

Clock rate pulses will continue to be entered into the pulse counter 26 and should there be an absence of a signal in zone three, the count in pulse counter 26 will again reach a quantity of 72 and the zero insert operation described above will be repeated serving to shift all the stored conditions in the plus shift register 14 and the minus shift register 36 one position to the right, and to introduce zeros into the H stages of the shift registers 14 and 36, as described above.

Summarizing the conditions of operation for condition "3," it has been shown how the absence of pulses have been detected through the medium of pulse counts and the representative zero state has been stored for each such zone condition in the plus and minus shift registers 14 and 36, respectively.

While the circuit operations described above for each of the three conditions have been described in conjunction with plus signals, it is to be pointed out that minus signals are equally effective in controlling the circuitry. Referring to FIG. 10, it may be noted that all characters begin with a plus signal and may then be followed by a plus signal, a minus signal, or no signal. For example, the digit character "4" shown in FIG. 8*a* and in the chart of FIG. 10 is characterized by a plus signal in zone 1, no signal in zone 2, and a minus signal in zone 3, etc. The minus signal beginning at the leading edge of zone 3 will be detected by the sensing device 10 and coupled to amplifier 11 wherein the signal is amplified and then coupled to the minus quantizer 40. The signal output from the quantizer 40 serves to turn the minus latch 41 "on" in the same manner that the plus signal output from quantizer 12 turned "on" the plus latch 13. The "on" signal output from the minus latch 41 serves to gate the "on" side of the H stage of the minus shift register 36 while the "off" signal from the plus latch 13 serves to gate the "off" side of the H stage of the plus shift register 14 for a bit insert entry to be effected by the bit insert latch 30 being triggered "on" thereby serving to trigger the H stage of the plus shift 14 "off" and the H stage of the minus shift register 36 "on." Otherwise, the control process for gating clock and half-rate clock pulses into the width counter 24 and pulse counter 26 are the same as described above for the plus pulse conditions.

Summarizing the operation thus far described, it has been shown how plus pulses are entered into the H stage of the plus shift register 14 as an "on" state, minus pulses are entered into the H stage of the minus shift register 36 as an "on" state, and a no-pulse condition is entered into the H stage of both the plus shift register 14 and the minus register 36 as an "off" state. It has also been shown how the shift registers 14 and 36 are shifted one position to the right just prior to a bit insert or zero insert operation.

Figure 3:
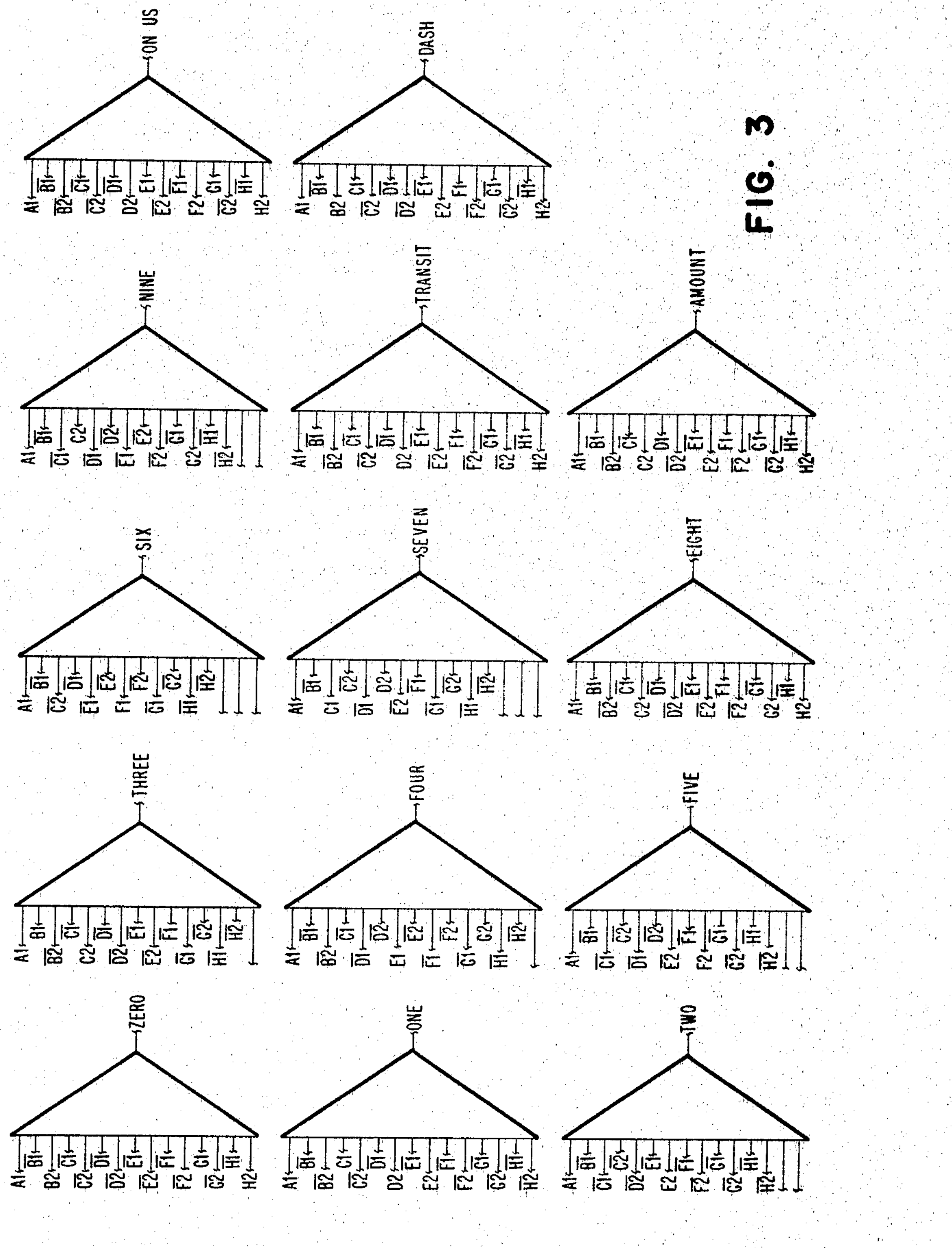
FIG. 3 is a coincidence circuit arrangement for the output of the shift registers shown in FIG. 1*c* to enable character decoding.
Figure 4:
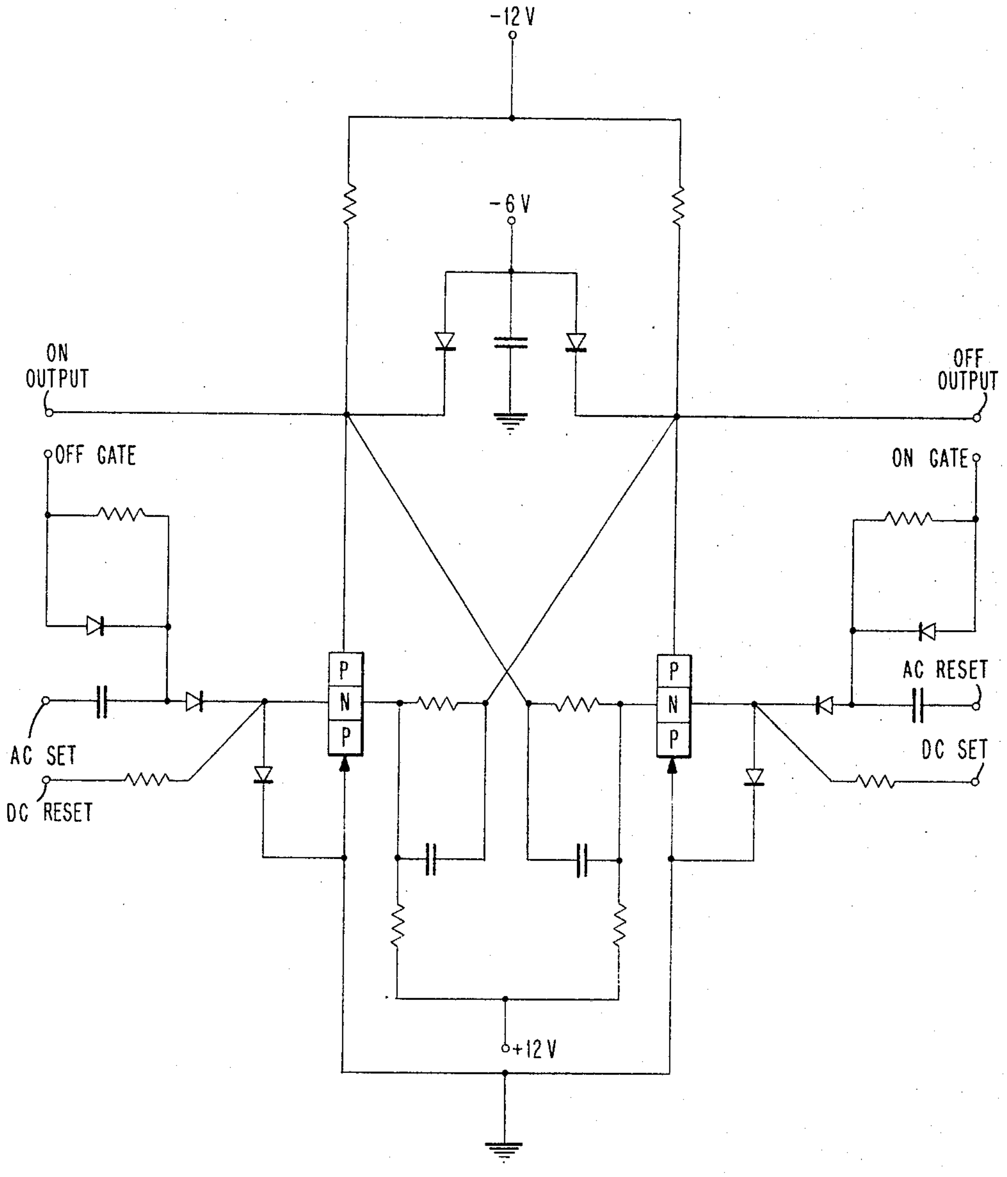
FIG. 4 is a circuit detail for a trigger circuit of the type employed in the latches shown in FIG. 1*a*.

A single character sensing operation is terminated when the first plus signal occurring in zone 1 and entered into the plus shift register has been shifted from the A stage to the J stage thereby turning the J stage "on." The switch of the J stage to the "on" state terminates the gate for character latch 15 and serves to reset all stages of both the plus and shift registers to an "off" state and in readiness for the next character sensing operation. Prior to the reset of the shift registers, the coincident output of the plus and minus shift registers 14 and 36 are applied to the AND switching configurations shown in FIG. 3 and enables the character evaluatian for each character for transmission to utilization means.

Thus, there has been described a novel and useful arrangement of circuitry which enables the sensing of character data that has been recorded on record mediums in magnetic ink.

While the width counter 24 and the pulse counter 26 have been arbitrarily adapted to operate in a controlling manner on counts of 24 and 72, respectively, it may be pointed out that other arbitrary counting arrangements could be made to work equally as well without departing from the spirit of the invention.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. A character recognition measuring system comprising:

(a) a sensing device, (b) means for moving said sensing device and a document relative to one another at a substantially constant velocity to successfully pass each character to be read on the document under said sensing device.

(c) pulse quantizing means coupled with said sensing device and adapted to provide a plurality of bit representing pulses of plus and minus polarity in responsive to the passing of a character under said sensing device, the pattern of pulses being different for each different character to be sensed, (d) storage means having a first level including a plurality of stages for storing bit representing pulses of one polarity and a second level including a plurality of stages for storing bit representing pulses of the opposite polarity, (e) gating means coupled with the inputs to the first and second levels of said storage means, said gating means being normally closed, (f) a bistable bit insert switching means adapted to be switched from a normal stable state to the other stable state, (g) control means coupled with said pulse quantizing means and responsive to the leading edge of the bit representing pulses for opening said gating means (e), and responsive to the trailing edge of the bit representing pulses for switching said bistable bit insert switching means from its normally stable state to its other stable state with the output therefrom being coincidentally applied to said gating means (e) in its opened condition for introducing plus or minus bit representing pulses into the first or second levels, respectively, of said storage means, (h) a pulse generator capable of producing pulses at a predetermined frequency, (i) a binary pulse counter, (j) second gating means coupling said pulse generator to the input of said binary pulse counter, the second gating means being normally closed, (k) second control means coupled with said plus quantizing means and responsive to the leading edge of the bit representing pulses for opening said second gating means (j) and responsive to the trailing edge of the bit representing pulses for restoring the gate to its normally closed condition, (l) a coincidence switching device coupled with the output of said binary pulse counter adapted to be operative when the pulse count in said binary pulse counter reaches a predetermined quantity and operative to switch and bistable bit insert switching means from its normal stable state to its other stable state with the output therefrom being coincidentally applied to the gating means (e) in its opened condition for introducing a plus or minus bit representing pulse into the first or second level, respectively, of said storage means, (m) means controlled by said bistable bit insert switching means (f) for resetting said binary pulse counter to a zero quantity, and (n) character evaluation means coupled with the outputs of said storage means.

2. A character recognition measuring system comprising:

(a) a sensing device, (b) means for moving said sensing device and a document relative to one another at a substantially constant velocity to successively pass each character to be read on the document under said sensing device, (c) pulse quantizing means coupled with said sensing device and adapted to provide a plurality of bit representing pulses of plus and minus polarity in response to the passing of a character under said sensing device, the pattern of pulses beign different for each different character to be sensed, (d) storage means having a first level including a plurality of stages for storing bit representing pulses of one polarity and a second level including a plurality of stages for storing bit representing pulses of the opposite polarity, (e) gating means coupled with the inputs to the first and second levels of said storage means, said gating means being normally closed, (f) a bistable bit insert switching means adapted to be switched from a normally stable state to the other stable state, (g) control means coupled with said pulse quantizing means and responsive to the leading edge of the bit representing pulses for opening said gating means (e), and responsive to the trailing edge of the bit representing pulses for switching said bistable bit insert switching means from its normally stable state to its other stable state with the output therefrom being coincidentally applied to said gating means (e) in its opened condition for introducing plus or minus bit representing pulses into the first or second levels, respectively, of said storage means, (h) a pulse generator capable of producing pulses at a predetermined frequency, (i) a binary pulse counter, (j) second gating means coupling said pulse generator to the input of said binary pulse counter, the second gating means being normally closed, (k) second control means coupled with said pulse quantizing means and responsive to the absence of bit representing pulses for opening said second gating means (j) for introducing pulses into said binary pulse counter, (l) a bistable zero insert switching means adapted to be switched from a normally stable state to its other stable state and coupled with the output of said second binary pulse counter and adapted to be switched when the count in said binary pulse counter reaches a predetermined quantity, with the output from said bistable zero insert switching means serving to introduce a no-pulse condition into both the plus and minus levels of said storage means, (m) means controlled by said bistable zero insert switching means for resetting said second binary pulse counter to a lower predetermined value, and (n) character evaluation means coupled with the outputs of said storage means.

3. A character recognition system comprising:

(a) a sensing device, (b) means for moving said sensing device and a document relative to one another at a substantially constant velocity to successively pass each character to be read on the document under said sensing device, (c) pulse quantizing means coupled with said sensing device and adapted to provide a plurality of bit representing pulses of plus and minus polarity in response to the passing of a character under said sensing device, the pattern of pulses being different for each different character to be sensed, (d) storage means having a first level including a plurality of stages for storing bit representing pulses of one polarity and a second level including a plurality of stages for storing bit representing pulses of the opposite polarity, (e) gating means coupled with the inputs to the first and second levels of said storage means, said gating being normally closed, (f) a bistable bit insert switching means adapted to be switched from a normally stable state to the other stable state, (g) control means coupled with said pulse quantizing means and responsive to the leading edge of the bit representing pulses for opening said gating means (e), and responsive to the trailing edge of the bit representing pulses for switching said bistable bit insert switching means from its normally stable state with the output therefrom being coincidentally applied to said gating means (e) in its opened condition for introducing plus or minus bit representing pulses into the first or second levels, respectively, of said storage means, (h) a first pulse generator capable of producing pulses at a predetermined frequency, (i) a second pulse generator capable of producing pulses at half the frequency of said first pulse generator, (j) a binary pulse counter, (k) second gating means coupling said second pulse generator to the input of said binary pulse counter, the gating means being normally closed, (l) second control means coupled with said pulse quantizing means and responsive to the leading edge of the bit representing pulses for opening said second gating means (k) and responsive to the trailing edge of the bit representing pulses for restoring said gate to its normally closed condition, (m) a coincidence switching device coupled with the output of said binary pulse counter adapted to be operative when the pulse count in said binary pulse counter reaches a predetermined quantity and operative to switch said bistable bit insert switching means from its normal stable state to its other stable state with the output therefrom being coincidentally applied to the gating means (e) in its opened condition for introducing a plus or minus bit representing pulse into the first or second level, respectively, of said storage means, (n) means controlled by said bistable bit insert switching means (f) for resetting said binary pulse counter to a zero quantity, (o) a second binary pulse counter, (p) third gating means coupling said first pulse generator to the input of said second binary pulse counter, the gating means being normally closed, (q) third control means coupled with said pulse quantizing means and responsive to the absence of bit representing pulses for opening said third gating means (p) for introducing pulses into said second binary pulse counter, (r) a bistable zero insert switching means adapted to be switched from a normally stable state to its other stable state and coupled with the output of said second binary pulse counter and adapted to be switched when the count in said binary pulse counter reaches a predetermined quantity, with the output from said bistable zero insert switching means serving to introduce a no-pulse condition into both the plus and minus levels of said storage means, (s) means controlled by said bistable zero insert switching means (r) for resetting said second binary pulse counter to a lower predetermined value, and (t) character evaluation means coupled with the outputs of said storage means.

4. A character recognition system comprising:

(a) a sensing device, (b) means to move a document relative to said sensing device, (c) pulse shaping means coupled with said sensing device and adapted to provide a plurality of bit representing pulses of plus and minus polarity in response to the passing of a character under said sensing device, the pattern of pulses being different for each different character to be sensed, (d) first level storage means including a plurality of stages for storing bit representing pulses of a positive polarity, (e) second level storage means including a plurality of stages for storing bit representing pulses of a negative polarity, (f) positive signal gating means coupled with the input to said first level storage means, said gating means being normally closed, (g) negative signal gating means coupled with the input to said second level storage means, said gating means being normally closed, (h) a positive signal control means coupled with said pulse shaping means and responsive to bit representing pulses of positive polarity for opening said positive signal gating means, (i) a negative signal control means coupled with said pulse shaping means and responsive to bit representing pulses of negative polarity for opening said negative gating means, (j) a bistable bit insert switching means adapted to be switched from a normally stable state to its other stable state, (k) control means coupled with said pulse shaping means and responsive to the trailing edge of the bit representing pulses for switching said bistable bit insert switching means from its normally stable state to its other stable state with the output therefrom being coincidentally applied to said positive signal gating means or negative signal gating means whichever is in the open condition for introducing positive or negative bit representing pulses into the first or second level storage means, respectively, (l) pulse generating means capable of producing pulses of at least two different predetermined frequencies, (m) a pulse timing means, (n) gating means coupling one output of said pulse generator to the input of said pulse timing means, said gating means being normally closed, and operative under said positive and negative signal control means for introducing pulses from said pulse generator into said timing means whenever there is a positive or negative pulse condition present, (o) a coincidence switching device coupled with the output of said timing means and adapted to be operative after a predetermined quantity of pulses have been introduced into said timing means to switch said bistable bit insert switching means from its normal state to its other stable state with the output therefrom being coincidentally applied to the positive signal gating means or negative signal gating means in the open condition for introducing either a positive or a negative bit representing pulse into the first level storage means or the second level storage means, respectively, (p) a second timing means adapted to receive pulses from the second output of said pulse generating means under the control of said control means (k) when there is an absence of bit representing pulses from said pulse shaping means for introducing pulses from said pulse generator into said second timing means, (q) a bistable zero insert switching means adapted to be switched from a normally stable state to its other stable state after a predetermined quantity of pulses have been introduced into said second timing means, with the output from the bistable zero insert switching means serving to introduce a no-pulse condition into both the first level and second level of storage means, and (r) character evaluation means coupled with the outputs of said storage means.

References Cited by the Examiner

UNITED STATES PATENTS

| | | | |
|---|---|---|---|
| 2,889,535 | 6/1959 | Rochester | 340—146.3 |
| 3,088,096 | 4/1963 | Steinbuck | 340—146.3 |
| 3,111,646 | 11/1963 | Harmon | 340—146.3 |
| 3,140,466 | 7/1964 | Greanias | 340—146.3 |

FOREIGN PATENTS

| | | |
|---|---|---|
| 915,344 | 1/1963 | Great Britain. |
| 916,305 | 1/1963 | Great Britain. |

MAYNARD R. WILBUR, *Primary Examiner.*

DARYL W. COOK, MALCOLM A. MORRISON, *Examiners.*

J. E. SMITH, J. S. IANDIORIO, *Assistant Examiners.*

UNITED STATES PATENT OFFICE

CERTIFICATE OF CORRECTION

Patent No. 3,278,900 October 11, 1966

Billy G. Wood

It is hereby certified that error appears in the above numbered patent requiring correction and that the said Letters Patent should read as corrected below.

Column 8, line 47, strike out "measuring"; line 52, for "successfully" read -- successively --; line 57, for "responsive" read -- response --; line 69, for "normal" read -- normally --; column 9, line 13, for "plus" read -- pulse --; line 23, for "and" read -- said --; lines 27 to 29, should not appear as a separate paragraph; line 46, for "beign" read -- being --; column 10, line 67, for "said" read -- the --.

Signed and sealed this 5th day of September 1967.

(SEAL)
Attest:

ERNEST W. SWIDER
Attesting Officer

EDWARD J. BRENNER
Commissioner of Patents